United States Patent Office 2,774,783
Patented Dec. 18, 1956

2,774,783

1,1-DICYANO ETHYLENES AND ETHANES CONTAINING HALOGEN SUBSTITUENTS

Alan E. Ardis, Hamden, Conn., assignor to The B. F. Goodrich Company, New York, N. Y., a corporation of New York No Drawing. Application September 24, 1953,
Serial No. 382,189

20 Claims. (Cl. 260—465.7)

This invention relates to 1,1-dicyano ethylenes and ethanes containing halogen substituents and to a method for their preparation which comprises halogenation of 1,1-dicyano ethylene and halogen derivatives of 1,1-dicyano ethylene to procure 1,1-dicyano (di, tri, and tetra)-halogenated ethanes, and dehydrohalogenation of 1,1-dicyano ethanes containing halogen substituents to procure 1,1-dicyano (mono and di)-halogenated ethylenes.

I have found that new and useful halogenated 1,1-dicyano ethylenes having the structural formula

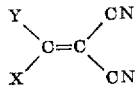

in which X represents a halogen and Y represents a halogen or hydrogen can be prepared by dehydrohalogenation of a polyhalogenated 1,1-dicyano ethane having at least one but not more than two hydrogen atoms in the molecule. The polyhalogenated 1,1-dicyano ethanes have the general structural formula

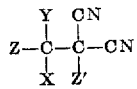

wherein X and Y have the same designation as above and Z and Z' represent, alternately, hydrogen or a halogen, so that if Z is a halogen Z' is hydrogen, and if Z' is a halogen Z is hydrogen.

I have also found that new and useful polyhalogenated 1,1-dicyano ethanes can be prepared by halogenation of 1,1-dicyano ethylene and halogen derivatives of 1,1-dicyano ethylene having the structural formula

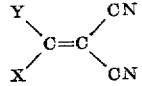

wherein X and Y represent either a halogen or hydrogen, respectively.

The specific new compounds of this invention include 1,1-dicyano-2-haloethylenes; 1,1-dicyano-2,2-dihaloethylenes; 1,1-dicyano-1,2-dihaloethanes; 1,1-dicyano-1,2,2-trihaloethanes; 1,1-dicyano-2,2,2-trihaloethanes and 1,1-dicyano-1,2,2,2-tetrahaloethanes.

The 1,1-dicyano-1,2-dihaloethanes of this invention can be prepared by a method which comprises reacting a halogen with 1,1-dicyano ethylene. The reactant 1,1-dicyano ethylene is obtained by pyrolysing 1-acetoxy-1,1-dicyano ethane at a temperature of from about 400° C. to about 750° C. and fractionally distilling the pyrolysis products. More accurate details of the procedure for preparing 1,1-dicyano ethylene are disclosed in U. S. Patent 2,476,270. Furthermore, controlled halogenation of 1,1-dicyano-1,2-dihaloethanes to substitute a halogen for one or both hydrogen atoms can be employed to yield 1,1-dicyano-1,2,2-trihaloethanes and 1,1-dicyano-1,2,2,2-tetrahaloethanes.

In the preparation of 1,1-dicyano-1,2-dihaloethanes the method preferably employed is to pass a gaseous halogen through a solution of monomeric 1,1-dicyano ethylene and a halogenated aliphatic hydrocarbon diluent in the presence of a halogenation catalyst for a sufficient length of time to saturate the carbon-to-carbon double bond. The pyrolysis products of 1-acetoxy-1,1-dicyano ethane referred to hereinbefore can be halogenated without necessarily separating crude monomeric 1,1-dicyano ethylene although when this method is followed the yield of halogenated 1,1-dicyano-1,2-dihaloethane is usually diminished. The unrefined 1,1-dicyano ethylene will also react without the addition of a halogenation catalyst to the pyrolysis products. Halogenated aliphatic hydrocarbon diluents, such as carbon tetrachloride, chloroform, sym-tetrachloroethane and the like, may be successfully employed as inert diluents for the unsaturated monomer. The halogenation reaction can be carried out void of a halogenated aliphatic hydrocarbon diluent, but in such instances the rate of reaction is difficult to control.

It is desirable when a diluent is employed in this invention that the diluent be free of water. The diluent can be dried with a suitable drying agent, such as phosphorus pentoxide, calcium chloride or the like, or distilled to remove water and any alcohols that may be present. This procedure is employed to diminish the probability of homopolymerization of the 1,1-dicyano ethylene monomer which is inherently unstable and polymerizes instantly in the cold upon contact with water, alcohols, amines, and certain other ionic organic and inorganic substances.

Catalysis of the halogenation reaction is not imperative but is highly desirable in order to reduce the reaction time required for optimum conversion of 1,1-dicyano ethylene to the halogenated product. Red phosphorus is a preferred catalyst, although halogenation catalysts well known to the art including inorganic halides of phosphorus, antimony, aluminum, and iron can be employed successfully in the halogenation reaction of this invention.

The temperature at which the halogenation reaction is conducted can be varied widely. Temperatures in the range of about 20° C. to about 100° C. are desirably utilized, although temperatures as high as 150° C. or even higher, and as low as about 0° C. or even lower may be employed, if desired.

The product of the halogenation of 1,1-dicyano ethylene, usually collected as a solid at room temperature, can be separated from other halogenation products by any of several different methods. For example, one method consists of fractionally distilling the halogenation products, preferably at reduced pressures, whereupon a fraction consisting substantially of 1,1-dicyano-1,2-dihaloethane is obtained. This fraction can be further purified by recrystallization from an aliphatic hydrocarbon such as hexane, butane, octane and the like, filtered free of the aliphatic hydrocarbon and dried.

A preferred method employed in the halogenation of 1,1-dicyano-2-haloethylenes to obtain 1,1-dicyano-1,2,2-trihaloethanes is analogous to that described hereinabove for the halogenation of 1,1-dicyano ethylene. The reaction is preferably conducted by passing a gaseous halogen through a solution of a 1,1-dicyano-2-haloethylene in a halogenated aliphatic hydrocarbon diluent in the presence of a halogenation catalyst. Exclusion of water from the reaction medium during the halogenation of 1,1-dicyano-2-haloethylenes is not essential because homopolymerization does not take place in water under normal reaction conditions, but is desirable in order to prevent degradation of the halogenated monomeric product. The halogenation of 1,1-dicyano-2-haloethylenes can be carried out free of a halogenated aliphatic hydrocarbon diluent and void of a halogenation catalyst. The temperature range during the halogenation reaction can be varied widely. A preferred range is from about 20° C. to about 100° C., although temperatures as high as 150° C., and as low as 0° C. may be employed successfully. The 1,1-dicyano-1,2,2-trihaloethanes may be recovered in the same manner described for the recovery of 1,1-dicyano-1,2-dihaloethanes.

The 1,1-dicyano-1,2,2,2-tetrahaloethanes of this invention can be prepared by halogenation of a 1,1-dicyano-2,2-dihaloethylene in a manner similar to that described for the preparation of 1,1-dicyano-1,2-dihaloethanes and 1,1-dicyano-1,2,2-trihaloethanes. A preferred method for the preparation of 1,1-dicyano-1,2,2,2-tetrahaloethanes is to pass a gaseous halogen through a solution of a 1,1-dicyano-2,2-dihaloethylene in a halogenated aliphatic hydrocarbon diluent in the presence of a halogenation catalyst, such as red phosphorus, for a period of time sufficient to saturate the carbon-to-carbon double bond. The method may be varied to exclude a halogenation catalyst and a halogenated aliphatic hydrocarbon diluent. It is highly desirable but not essential that water be excluded from the reaction medium to minimize the possibility of degradation of the halogenated compounds. The temperature range utilized in the halogenation reaction may be varied within the range described in the halogenation of 1,1-dicyano ethylene and 1,1-dicyano-2-haloethylene. The preferred halogenation temperature range is from of about 20° C. to about 100° C., although temperatures as high as 150° C. or even higher, or as low as about 0° C. or even lower may be employed. The 1,1-dicyano-1,2,2,2-tetrahaloethanes can be readily separated by fractional distillation.

1,1-dicyano-1,2,2,2-tetrahaloethanes can also be prepared by a method of direct substitution of a halogen, at elevated temperatures, for the available hydrogen atoms of 1,1-dicyano-1,2-dihaloethanes and 1,1-dicyano-1,2,2-trihaloethanes.

Preparation of 1,1-dicyano-1,2,2-trihaloethanes and 1,1-dicyano-1,2,2,2-tetrahaloethanes, wherein different halogen species are present in the molecule can be effected by halogenating 1,1-dicyano-2-haloethylenes and 1,1-dicyano-2,2-dihaloethylenes with a halogen species different from that which is contained in the unsaturated molecule.

1,1-dicyano-2-haloethylenes can be obtained by dehydrohalogenation of 1,1-dicyano-1,2-dihaloethanes and the said dehydrohalogenation can be conducted in any one of several different manners. A preferred method of dehydrohalogenation is accomplished by dissolving a purified 1,1-dicyano-1,2-dihaloethane in a halogenated aliphatic hydrocarbon, such as chloroform, carbon tetrachloride, sym-tetrachloroethane and the like, passing the solution through a heated Vycor tube (made of a glass consisting almost entirely of silicon dioxide and capable of withstanding temperatures of 600° C. and above), thereby effecting vaporization and decomposition of the saturated 1,1-dicyano-1,2-dihaloethane to obtain 1,1-dicyano-2-haloethylene and a hydrogen halide and condensing the pyrolysis products which are liquifiable at temperatures down to about 0° C. The 1,1-dicyano-2-haloethylenes can then be recovered from the condensation products by fractional distillation, preferably at reduced pressures. In the operation of this invention, it is not necessary that the 1,1-dicyano-1,2-dihaloethane be extracted from the resulting halogenation products of 1,1-dicyano ethylene, but the quantity of 1,1-dicyano-2-haloethylene obtained when the halogenated products are pyrolysed without separation is usually less than that recovered when purified 1,1-dicyano-2-haloethylene is employed.

Dehydrohalogenation of 1,1-dicyano-1,2-dihaloethanes can be conducted in the temperature range of about 400° C. to about 600° C. A preferred temperature range in accordance with this invention is from about 450° C. to about 500° C.

Separation of 1,1-dicyano-2-haloethylenes, after decomposition, from the condensation products can be carried out in several manners. One method consists of fractionally distilling the condensation products, preferably at reduced pressures, to yield the desired product.

Preparation of 1,1-dicyano-2,2-dihaloethylenes can be most conveniently prepared by dehydrohalogenation of 1,1-dicyano-1,2,2-trihaloethanes by methods analogous to those disclosed hereinabove for the dehydrohalogenation of 1,1-dicyano-1,2-dihaloethanes.

Preparation of 1,1-dicyano-2,2-dihaloethylenes, wherein the two halogen atoms affixed to the same carbon atom are different, for example 1,1-dicyano-2-chloro-2-bromoethylene, can be effected in accordance with this invention by the halogenation of 1,1-dicyano ethylene, decomposition of the resulting product, followed by halogenation with a halogen different from that which is attached to the monohalogenated dicyano ethylene, and recovery of the desired 1,1-dicyano-2,2-dihaloethylene.

The halogenation addition reactions described hereinbefore can be formulated as follows:

1.

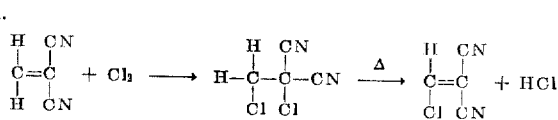

2.

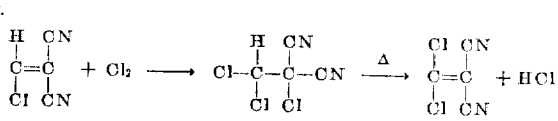

3.

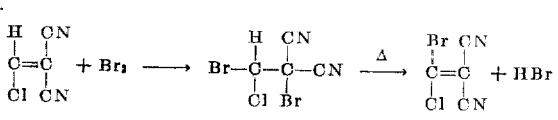

4.

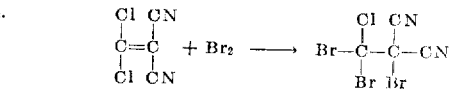

The following examples are intended to illustrate the preparation of 1,1-dicyano-2-haloethylenes; 1,1-dicyano-2,2-dihaloethylenes; 1,1-dicyano-1,2-dihaloethanes; 1,1-dicyano-1,2,2-trihaloethanes; and 1,1-dicyano-1,2,2,2-tetrahaloethanes. It is not intended, however, to limit the invention thereto, for there are, of course, numerous modifications, which will be readily apparent to those skilled in the art. In the examples which follow, all parts are by weight unless otherwise indicated.

*Example 1*

A one liter three-necked round bottom flask equipped with a thermometer, a fritted glass addition tube, and a reflux condensor was charged with 213 parts of 1,1-dicyano ethylene and 104 parts of chloroform that had been dried over phosphorus pentoxide to remove any water that might have been present. Chlorine was passed slowly through a sulfuric acid scrubber and admitted beneath the surface of the 1,1-dicyano ethylene-chloroform solution. The temperature of the reaction mixture rose slowly from room temperature to about 70° C. without external heating. Upon reaching 70° C. phosphorus pentachloride was added to the reactants in approximately one-half gram quantities. Like amounts were added whenever the reaction temperature fell below 65° C. When no appreciable amount of exothermicity was observed upon the addition of phosphorus pentachloride the reaction was stopped. The reaction temperature was controlled by means of a cold water bath to prevent excessive pressure build up within the reaction flask. After six hours, 142 parts of chlorine had been absorbed out of theoretical 190 parts. Upon distillation 365 grams of 1,1-dicyano-1,2-dichloroethane were obtained, which represented a 91.3% yield. The compound was a solid at room temperature and had a boiling point of 88° C. at 28 mm. pressure. The material analysed as follows:

| Atoms | Found | Theory |
| --- | --- | --- |
| Percent Carbon | 32.15 | 32.24 |
| Percent Hydrogen | 1.50 | 1.36 |
| Percent Nitrogen | 18.67 | 18.81 |
| Percent Chlorine | 46.3 | 47.59 |

*Example II*

A flask was charged with 1,1-dicyano ethylene and chloroform that had been previously dried over phosphorus pentoxide. The solution was halogenated with bromine for several hours in the same manner disclosed in Example I. The reaction product was fractionally distilled and 1,1-dicyano-1,2-dibromoethane was recovered in substantial yield.

*Example III*

A solution of 114 parts of 1,1-dicyano-1,2-dichloroethane in 162 parts of carbon tetrachloride that had been dried over phosphorus pentoxide for 1 hour, was placed in a Hershberg dropping funnel leading to a Vycor tube (22 mm. I. D. by 870 mm. long, equipped with a concentric thermocouple well and packed with 3 mm. Vycor rings, and heated by two 750 watt Hevi-Duty electric combustion furnaces). The Vycor tube led through an adapter to a one liter three-necked flask cooled with an ice bath and equipped with a reflux condensor. The 1,1-dicyano-1,2-dichloroethane-carbon tetrachloride solution was admitted to the glass Vycor tube over a period of four hours while the temperature was maintained at 475° C. to 500° C. The liquid product collected was distilled through a two-foot distillation column packed with glass helices. 77 grams, an 89% yield, of 1,1-dicyano-2-chloro ethylene with a boiling point of 92° C./26 mm., M. P. 19° C., N (index of refraction at room temperature) =1.495 were collected. The product analysed as follows:

| Atoms | Found | Theory |
| --- | --- | --- |
| Percent Carbon | 42.19 | 42.71 |
| Percent Hydrogen | 0.98 | 0.89 |
| Percent Nitrogen | 24.53 | 24.91 |
| Percent Chlorine | 31.63 | 31.52 |

*Example IV*

1,1-dicyano-2-chloroethylene in solution in chloroform was chlorinated in the same manner as described in Example I, and 1,1-dicyano-1,2,2-trichloroethane, a solid at room temperatures, was recovered by fractional distillation in a substantial yield. Boiling point 69–70° C./5 mm.; N (index of refraction at room temperature) =1.478; nitrogen analysis theory 15.3%, found 14.92%; chlorine analysis theory 58.0%, found 57.5%.

*Example V*

1,1-dicyano-1,2,2-trichloroethane was dissolved in carbon tetrachloride that had been dried over $P_2O_5$ and decanted and the solution placed in a dropping funnel, admitted therefrom to a Vycor pyrolysis tube maintained at a temperature of 450° C. to 525° C. and the dehydrohalogenation products were collected in the same manner as described in Example III. The dehydrohalogenation product 1,1-dicyano-2,2-dichloroethylene (M. P. 63–64° C.) was recovered by fractional distillation (B. P. 93–94° C./30 mm.) and identified by nitrogen analysis (theory 19.10%, found 19.09%) and further identified by forming its Diels-Alder adduct with cyclopentadiene. The addition reaction between 1,1-dicyanohaloethylene and cyclopentadiene can be used for qualitative analysis of cyclopentadiene.

*Example VI*

1,1-dicyano-2-chloroethylene dissolved in chloroform was brominated in accordance with the method described in Example I. The addition product, 1,1-dicyano-2-chloro-1,2-dibromoethane, was obtained, and recovered by fractional distillation at reduced pressures. The 1,1-dicyano-2-chloro-1,2-dibromoethane was then dehydrohalogenated and the decomposition product 1,1-dicyano-2-chloro-2-bromoethylene was obtained in substantial yield. 1,1-dicyano-2-chloro-2-bromoethylene can also be obtained by bromination of 1,1-dicyano ethylene followed by dehydrohalogenation and chlorination to obtain 1,1-dicyano-1,2-dichloro-2-bromoethane, and dehydrohalogenation of the aforesaid to recover 1,1-dicyano-2-chloro-2-bromoethylene.

*Example VII*

211 parts of the pyrolysis products of 1-acetoxy-1,1-dicyano ethane containing 27.2% 1,1-dicyano ethylene was chlorinated by passing chlorine through the pyrolysis products. Upon the addition of chlorine, the temperature rose slowly to 90° C. and was arbitrarily held below 100° C. to prevent excessive pressure build-up in the reaction vessel. When further addition of chlorine did not cause an appreciable increase in exothermicity the chlorine addition was stopped. The product was fractionally distilled (B. P. 83–86° C./28 mm.) and 55 parts of 1,1-dicyano-1,2-dichloroethane was recovered amounting to a yield of 50.4%.

As hereinbefore stated, halogenation of the unsaturated 1,1-dicyano ethylenes proceeds with extreme slowness in the absence of a catalyst. In the presence of a catalyst, however, the reaction proceeds at a normal rate and is completed within a few hours. Thus, the addition of a catalyst to the reaction mixture is highly desirable for the attainment of maximum yields in a minimum time. Halogenation of the pyrolysis products of 1-acetoxy-1,1-dicyano ethane proceeds readily in the absence of a halogenation catalyst. It is presumed that the decomposition by-products readily facilitate and catalyse the halogenation reaction with unsaturation 1,1-dicyano ethylene.

1,1-dicyano-monohaloethylenes and 1,1-dicyano-dihaloethylenes are useful in the preparation of other compounds, such as adducts with conjugated dienes and as illustrated in the specification, 1,1-dicyano-haloethanes are useful in the preparation of 1,1-dicyano-halo-ethylenes.

Although specific examples are included herein, it is not intended to limit the invention thereto, for numerous modifications will be apparent to those skilled in the art, and are within the spirit and scope of the appended claims.

I claim:

1. A method for preparing halogen containing compounds comprising saturating the carbon-to-carbon unsaturation of 1,1-dicyano ethylene and halogenated 1,1-dicyano ethylene with a halogen selected from the class consisting of chlorine and bromine, under substantially anhydrous conditions and at a temperature of from about 0° C. to about 150° C.

2. A method for dehydrohalogenating 1,1-dicyano haloethanes comprising heating 1,1-dicyano ethanes having at least one hydrogen atom and from 2 to 3 halogen atoms in which the halogen is selected from the class consisting of chlorine and bromine to a temperature of from about 400° C. to about 600° C.

3. The method which comprises halogenating monomeric 1,1-dicyanoethylene with a halogen selected from the class consisting of chlorine and bromine, the halogenation being carried out under substantially anhydrous conditions and recovery of 1,1-dicyano-1,2-dihaloethane.

4. The method which comprises halogenating 1,1-dicyano monohaloethylene under substantially anhydrous conditions with a halogen selected from the class consisting of chlorine and bromine and recovering the 1,1-dicyano-1,2,2-trihaloethane.

5. The method which comprises halogenating 1,1-dicyano dihaloethylene under substantially anhydrous conditions with a halogen selected from the class consisting of chlorine and bromine and recovering the 1,1-dicyano-1,2,2,2-tetrahaloethane.

6. A method for preparing

comprising dehydrohalogenating

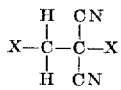

at a temperature of from about 400 to about 600° C., the X in the formulas being selected from the class consisting of chlorine and bromine.

7. A method for preparing

comprising dehydrohalogenating

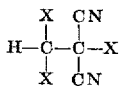

at a temperature of from about 400 to about 600° C., the X in the formulas being selected from the class consisting of chlorine and bromine.

8. The method which comprises halogenating monomeric 1,1-dicyano ethylene with chlorine under substantially anhydrous conditions and recovering 1,1-dicyano-1,2-dichloroethane.

9. The method which comprises halogenating monomeric 1,1-dicyano-2-chloroethylene with chlorine under substantially anhydrous conditions and recovering 1,1-dicyano-1,2,2-trichloroethane.

10. The method which comprises halogenating monomeric 1,1-dicyano-1,2-dichloroethylene with chlorine under substantially anhydrous conditions and recovering 1,1-dicyano-1,2,2,2-tetrachloroethane.

11. The method which comprises dehydrohalogenation of 1,1-dicyano-1,2-dichloroethane at a temperature of from about 400 to about 600° C. and recovering 1,1-dicyano 2-chloroethylene.

12. The method which comprises dehydrohalogenation of 1,1-dicyano-1,2,2-trichloroethane and recovering 1,1-dicyano-2,2-dichloroethylene.

13. The method according to claim 1 wherein the halogenation is carried out in the presence of a halogenation catalyst.

14. The method according to claim 13 wherein the halogenation is conducted in a temperature range from about 0° C. to about 150° C.

15. A chemical selected from the class consisting of 1,1-dicyano-2-haloethylene, 1,1-dicyano-2,2-dihaloethylene, 1,1-dicyano-1,2-dihaloethane, 1,1-dicyano-1,2,2-trihaloethane, and 1,1-dicyano-1,2,2,2-tetrahaloethane in which the halogen is selected from the class consisting of chlorine and bromine.

16. 1,1-dicyano-2-chloroethylene having the structural formula

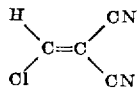

17. 1,1-dicyano-2,2-dichloroethylene having the structural formula

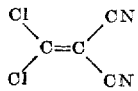

18. 1,1-dicyano-1,2-dichloroethane having the structural formula

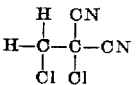

19. 1,1-dicyano-1,2,2-trichloroethane having the structural formula

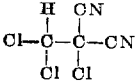

20. 1,1-dicyano-1,2,2,2-tetrachloroethane having the structural formula

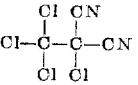

References Cited in the file of this patent

UNITED STATES PATENTS

| Number | Name | Date |
|---|---|---|
| 2,231,360 | D'Ianni | Feb. 11, 1941 |
| 2,328,984 | Lichty | Sept. 7, 1943 |
| 2,422,528 | Cass et al. | June 17, 1947 |
| 2,615,915 | Ladd | Oct. 28, 1952 |
| 2,640,073 | Ney | May 26, 1953 |

UNITED STATES PATENT OFFICE
Certificate of Correction

Patent No. 2,774,783            December 18, 1956

Alan E. Ardis

It is hereby certified that error appears in the printed specification of the above numbered patent requiring correction and that the said Letters Patent should read as corrected below.

Column 4, lines 41 to 43, inclusive, formula "4" should appear as shown below instead of as in the patent—

Signed and sealed this 19th day of November 1957.

[SEAL]

Attest:
KARL H. AXLINE,
*Attesting Officer.*

ROBERT C. WATSON,
*Commissioner of Patents.*